June 12, 1956     H. FINK ET AL     2,750,237

BEARING MEANS FOR SPINNING AND DOUBLING SPINDLES

Filed Jan. 8, 1953     2 Sheets-Sheet 1

INVENTORS
Heinrich Fink
Joseph Steichele
By Richard Low
Ag't

June 12, 1956 H. FINK ET AL 2,750,237
BEARING MEANS FOR SPINNING AND DOUBLING SPINDLES
Filed Jan. 8, 1953 2 Sheets-Sheet 2

INVENTORS
Heinrich Fink
Joseph Steichele
By Richard Lind
Ag't

2,750,237
BEARING MEANS FOR SPINNING AND DOUBLING SPINDLES

Heinrich Fink, Esslingen, and Joseph Steichele, Stuttgart-Weil im Dorf, Germany, assignors to SKF Kugellagerfabriken Gesellschaft mit beschränkter Haftung Application January 8, 1953, Serial No. 330,222

Claims priority, application Germany November 15, 1951

9 Claims. (Cl. 308—154)

This invention relates to bearing means for spinning and doubling spindles, particularly bearing means in which separate supporting elements for the collar and the footstep are accommodated in a joint spindle housing and in which the footstep while radially movable is secured against rotation.

It has been realised that it is particularly the construction of the footstep that is of significance for the degree to which the unbalancing oscillations can be taken up and absorbed, and an added appreciable centering of the spindles can be achieved.

There have been attempts to dispose at footsteps springy elements acting from at least three peripheral points in the direction of the spindle center, thereby offering to the dynamic forces acting upon the footstep a resistance which increases with the displacement of the spindle from the center line. As a result of inevitable differences in material and manufacturing allowances, these springy elements generally act in a one-sided manner so that collar and footstep cannot be aligned as accurately as is necessary in order to avoid excessive lateral pressures from the spindle and the bearing, having the result that the roller bearings used become worn prematurely and have to be replaced.

It is also known to dispose the footstep in a bearing sleeve which does not extend up to the collar but is braced against the spindle housing by means of a spring. The friction resulting from the displacement of the footstep causes a certain absorption of oscillations which, however, does not suffice to prevent the spindle from oscillating in case of considerable unbalance. The inadequacy of this construction lies particularly in the centering which is not sufficiently strong to prevent the spindle from being obliquely displaced. Although the pressure exerted by the spring does have a centering effect on the bearing sleeve, this centering effect has proved too weak to force the spindle back into the centric position against the effect of friction.

The primary object of our invention is to efficiently eliminate these shortcomings and to provide an improved bearing for spinning and doubling spindles.

A more specific object of our invention is to improve the bearing by improving its centering ability and its ability to absorb oscillations to such a degree that an unusually large unbalance can be controlled even at high spindle speeds.

One object of the invention is to provide a bearing of the type referred to of very simple construction.

A further object of our invention is to provide for the parts of the footstep bearing to be easily assembled and disassembled so that the attendance upon the lines of spindles of a given mill can be made particularly economical.

To the accomplishment of the foregoing and other more detailed objects which will appear hereinafter, my invention consists in a bearing for spinning and doubling spindles, the elements thereof, and the relation of the element one to the other, as are more particularly described in the specification and sought to be defined in the claims.

The specification is accompanied by drawings in which.

Figure 1:
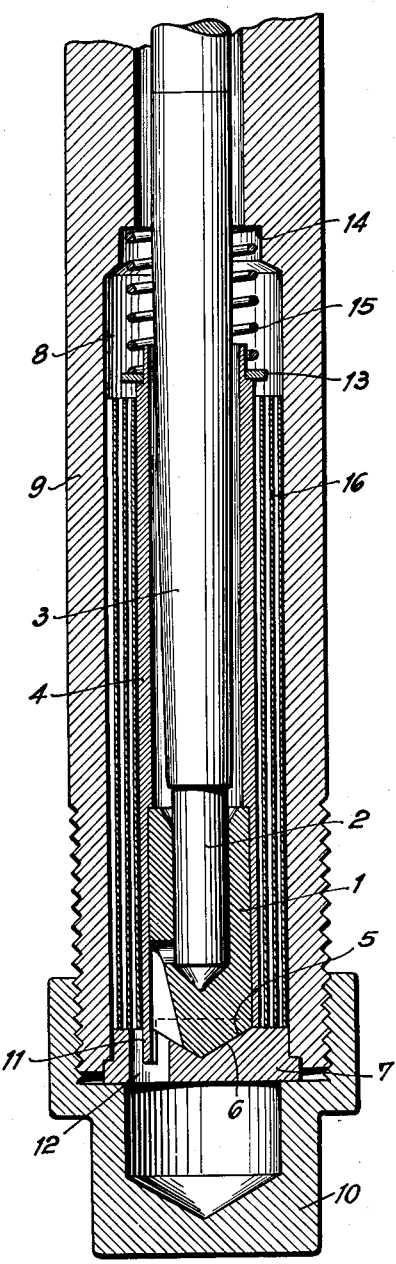
Fig. 1 is a longitudinal section of the bottom portion of one form of the spindle bearing according to our invention.

Referring to the drawings, and initially to Fig. 1, the footstep 1 supports the conical base 2 of the spindle 3 and is inserted in the bearing sleeve 4. The tapered face 5 of the footstep 1 rests on the face 6 of the abutment 7 which is provided with a corresponding taper. This abutment is fitted into the drilled hole 8 of the spindle housing 9 and is locked in position by the screw cap 10 that covers the end of the spindle housing. A projection 11 disposed at the bearing sleeve 4 engages in an opening 12 in the abutment 6, thereby preventing the footstep 1 from rotating. The bearing sleeve carries at its top a spring washer 13, and a pressure spring 15 extends between this washer and a stopping face 14 of the spindle housing 9. Inserted in the annular space formed in the hole 8 in the spindle housing between the inner wall of the spindle housing and the bearing sleeve 4 is a cushioning means in the form of a helically wound spring 16.

Figure 2:
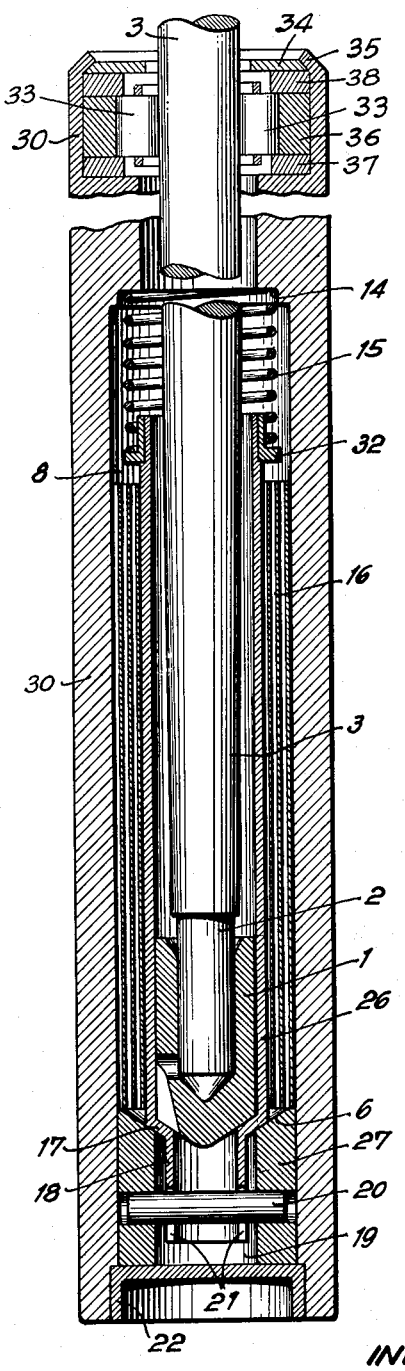
Fig. 2 is a longitudinal section of the bottom portion of a modified bearing.

In the embodiment according to Fig. 2, the footstep 1 rests on a tapered portion 17 of the bearing sleeve 26, which tapered portion bears against the tapered face 6 of the abutment 27. An adjoining piece 18 of the bearing sleeve 26 projects into the drilled hole 19 of the abutment 27, and a pin 20 inserted into the abutment and operating in conjunction with openings 21 of the piece 18 secures the bearing sleeve against rotation. The bottom end of the spindle housing 30 is covered with a screw cap 22, against the botton portion of which rests the abutment.

If the footstep 1 in either of the embodiments of Figs. 1 and 2 is displaced from its centric position under the effect of radial forces while the spindle is rotating, the respective tapered faces are displaced in relation to each other, and the resultant friction counteracts the displacement. As a result of the pressure exerted by the pressure spring 15 via the spring washer 13 and 32, respectively, upon the bearing sleeve 4 and 26, respectively, and, consequently, upon the footstep 1, the tapered faces return to their original position.

Reverting to Fig. 2, the collar 33 is shown to be rigidly accommodated within the upper portion of the spindle housing 30. The spindle 3 is given a firm support by the collar in radial direction. The collar is placed within an outer sleeve or outer race 36 which bears for its endwise support against washers 37 and 38. The disc 34 protects the collar from becoming defiled by dirt. To secure the collar axially and the disc 34 in its place, the spindle housing is flanged at its upper end, as at 35.

Figure 3:
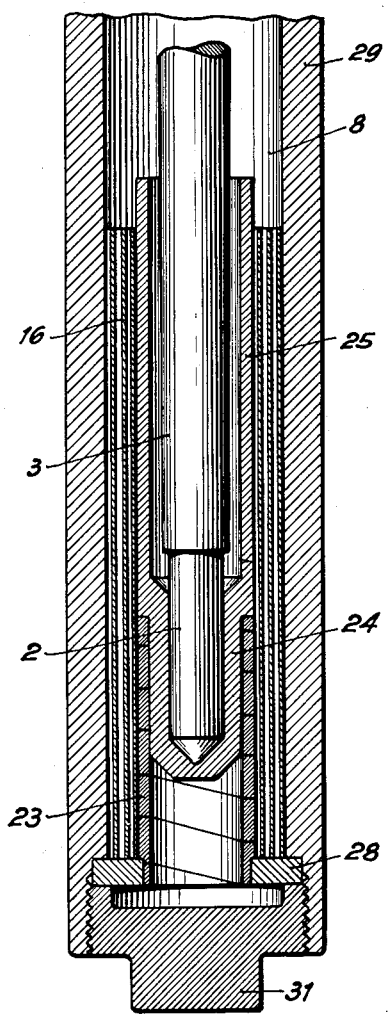
Fig. 3 is a longitudinal section of the bottom portion of another modification of the spindle bearing.

In the embodiment illustrated in Fig. 3, the footstep 24, which carries the conical base 2 of the spindle 3, is made in one piece with the bearing sleeve 25 and is inserted in a tubular coil spring 23. The bottom end of the tubular coil spring is fixedly connected with the flat annular abutment 28 which in turn is locked in the spindle housing 29 by means of the screw cap 31. The tubular coil spring 23, operating in conjunction with the abutment 28, recenters the footstep 24, if displaced, and at the same time takes up unbalancing oscillations.

In place of the tubular coil spring, other centering means may be used, such as resilient elements of the diaphragm type, as well as tubes having elasticity of flexure (corrugated tubes).

The helical spring 16, which in all embodiments according to the invention is accommodated in the annular space between the bearing sleeve 4, 26 and 25, respectively, and the wall of the spindle housing 9, 30 and 29, respectively, causes to increase materially the centering power and the absorbing effect which are due to the way in which the footstep 1, 24 is secured with respect to the abutment 7, 27, 28. The turns of the helical spring are arranged with a very small distance only between each other, and the lubricating oil, pressed through these narrow gaps, takes up a major portion of the oscillatory energy, thus assuring efficient absorption. Further, the elastic turns of the helical spring 16 offer a resistance to the displacement of the footstep 1, 24 from its centric position, which resistance increases in proportion to the oscillations unbalancing the spindle.

It is believed that the construction of the spindle bearing of the invention, and the many advantages thereof, will be understood from the foregoing detailed description. Some of the features and advantages are reviewed hereinafter.

According to one feature of the invention, the supporting element for the footstep is formed as a bearing sleeve that is surrounded over most of its length by an oscillation absorber which is known per se, such as a helically wound spring. Another feature of the invention consists in the footstep being centered, in conjunction with an abutment disposed at the free end of the spindle housing, in the area of the bottom face of the footstep which bears upon a centering element.

In one embodiment of our spindle bearing, the bottom face of the footstep is tapered and rests directly on the top face of the abutment which is provided with a corresponding taper, and in this embodiment, the bearing sleeve which rests on the abutment and is so secured to this that it cannot rotate, bears via a springy element against a stopping face disposed in the top portion of the spindle housing.

Another embodiment of the bearing of the invention provides that the tapered bottom face of the footstep bears against a tape red portion of the bearing sleeve which is spring-weighted from the top portion of the spindle housing, whereby said tapered portion rests against a matingly tapered top face of the abutment and is so secured to the abutment that it cannot rotate.

In a further embodiment of the invention, the footstep and bearing sleeve form an integral member, the footstep being surrounded by a tubular coil spring, the bottom end of which is fixedly secured to a flat annular abutment.

In all embodiments, the free end of the spindle housing is covered with a cap, for instance, a screw cap, that supports the abutment.

It will be clear that due to our invention a perfectly centric rotation of the spindles can be achieved even when employing high spindle speeds and heavy cops, and it would be possible to use spinning speeds which as yet cannot be used for other reasons.

It will be apparent that while we have shown and described our invention in a few forms only, many changes and modifications may be made without departing from the spirit of the invention defined in the following claims.

We claim:

1. Support for spinning and doubling spindle, comprising bearing means including a footstep and a collar, the collar being separately formed from the footstep, a bearing sleeve supporting the footstep, a separate support for the collar, stationary centering means for the footstep, the footstep bearing against the centering means to be radially movable independently of the collar but to be prevented from turning, an oscillation absorber surrounding the bearing sleeve over most of its length, and a spindle housing accommodating the bearing sleeve, the collar support, the centering means, and the oscillation absorber.

2. In the support according to claim 1, the footstep having a tapered bottom face, a member having a matingly tapered top face and serving as said centering means, said bottom face resting in said top face, the bearing sleeve engaging the footstep, resilient means housed within the spindle housing and urging the tapered bottom face, when radially displaced with respect to the tapered top face, via the bearing sleeve to its normal position.

3. In the support according to claim 2, the spindle housing being provided with a stopping face, a compression spring serving as said resilient means, one end of the spring bearing against the stopping face, the other spring end bearing against the upper edge of the bearing sleeve.

4. In the support according to claim 3, the centering member being provided with an opening, the bearing sleeve having a projection engaging in said opening.

5. In the support according to claim 1, a support at the bottom end of the spindle housing, and a screw cap fixing said support and covering said bottom end.

6. In the support according to claim 1, the footstep having a tapered bottom face, a member having a tapered top face, the bearing sleeve being provided with a tapered portion, said portion being sandwiched between said bottom face and top face, said member serving as said centering means, resilient means housed within the spindle housing and urging the said tapered bottom face, when radially displaced with respect to the said tapered top face, via the bearing sleeve to its normal position.

7. In the support according to claim 6, the spindle housing being provided with a stopping face, a compression spring serving as said resilient means, one end of the spring bearing against the stopping face, the other spring end bearing against the upper edge of the bearing sleeve, the said member being provided with a central hole, the bearing sleeve having an extension depending from the tapered portion and extending into said hole, registering transverse holes in the member and extension, a pin inserted in said transverse holes to secure the bearing sleeve against rotation.

8. In the support according to claim 1, the bearing sleeve having integrally formed therewith, at one end thereof, the footstep, a tubular resilient member generally surrounding the footstep-forming end portion of the bearing sleeve and forming said centering means, the oscillation absorber surrounding, in addition to the bearing sleeve, the tubular resilient member.

9. In the support according to claim 8, a coil spring serving as said tubular member, a flat annular member at the bottom of the coil spring, the lower end of the coil spring being fixedly secured to said flat member.

References Cited in the file of this patent

UNITED STATES PATENTS

| 490,245 | Day | Jan. 17, 1893 |
| 784,414 | McCracken | Mar. 7, 1905 |
| 2,202,746 | Raboisson | May 28, 1940 |
| 2,285,681 | Rushing | June 9, 1942 |